United States Patent
Xia et al.

(10) Patent No.: US 8,510,455 B2
(45) Date of Patent: Aug. 13, 2013

(54) METHOD AND APPARATUS FOR IP MOBILITY MANAGEMENT SELECTION

(75) Inventors: Yangsong Xia, Nanjing (CN); Behcet Sarikaya, Wylie, TX (US)

(73) Assignee: FutureWei Technologies, Inc., Plano, TX (US)

( * ) Notice: Subject to any disclaimer, the term of this patent is extended or adjusted under 35 U.S.C. 154(b) by 298 days.

(21) Appl. No.: 12/110,102

(22) Filed: Apr. 25, 2008

(65) Prior Publication Data

US 2008/0270534 A1    Oct. 30, 2008

Related U.S. Application Data

(60) Provisional application No. 60/914,980, filed on Apr. 30, 2007.

(51) Int. Cl.
*G06F 15/16*    (2006.01)

(52) U.S. Cl.
USPC .......................................... 709/230; 709/203

(58) Field of Classification Search
USPC ................. 709/201, 202, 203, 218, 222, 223, 709/230, 228, 238; 340/10.1; 455/410, 435.1, 455/456.1; 370/310, 338, 349, 351, 389, 370/219
See application file for complete search history.

(56) References Cited

U.S. PATENT DOCUMENTS

| | | | |
|---|---|---|---|
| 7,382,748 B1 * | 6/2008 | Bharatia et al. | 370/331 |
| 7,920,529 B1 * | 4/2011 | Mahler et al. | 370/338 |
| 2004/0087304 A1 * | 5/2004 | Buddhikot et al. | 455/426.2 |
| 2005/0128956 A1 * | 6/2005 | Hsu et al. | 370/252 |
| 2005/0228893 A1 * | 10/2005 | Devarapalli et al. | 709/228 |

(Continued)

FOREIGN PATENT DOCUMENTS

| | | |
|---|---|---|
| CN | 1595933 A | 3/2005 |
| CN | 1902882 A | 1/2007 |
| EP | 1848173 A1 * | 10/2007 |
| WO | WO 2005076564 A1 | 8/2005 |

OTHER PUBLICATIONS

Liang et al. A Local Authentication Control Scheme Based on AAA Architecture in Wireless Networks., Vehicular Technology Conference, 2004. VTC2004-Fall. 2004 IEEE $60^{th}$., vol. 7., 10.1109/VETECF.2004.1405108., 2004, pp. 5276-5280 vol. 7., 2004.*

(Continued)

*Primary Examiner* — Wing F Chan
*Assistant Examiner* — Kostas Katsikis
(74) *Attorney, Agent, or Firm* — Slater & Matsil, L.L.P.

(57) ABSTRACT

A communication network system having capability for IP mobility management selection. The communication system includes a server, a network entity, and at least one mobile node. The network entity is configured to provide its IP mobility management information to the server, whereas the mobile node is configured to provide its IP mobility management information to the server. In the communication system, the server is configured to make a selection of IP mobility management mechanism based on the information provided by the network entity and the mobile node. The server then sends the selection to the network entity. In a specific embodiment, the server can be an Authentication, Authorization and Accounting (AAA) server. Here, the IP mobility management information includes one or more supported IP mobility management protocols. For example, the supported IP mobility management protocols can include mobile IPv4, mobile IPv6, dual stack mobile IP, and proxy mobile IP, etc.

24 Claims, 6 Drawing Sheets

(56) References Cited

U.S. PATENT DOCUMENTS

| | | | | |
|---|---|---|---|---|
| 2006/0172732 A1* | 8/2006 | Nylander et al. | ............. | 455/433 |
| 2007/0037553 A1* | 2/2007 | Patel et al. | ................... | 455/410 |
| 2007/0080784 A1* | 4/2007 | Kim et al. | ................... | 340/10.1 |
| 2008/0059792 A1* | 3/2008 | Feder et al. | .................. | 713/155 |
| 2008/0159227 A1* | 7/2008 | Ulupinar et al. | ............. | 370/331 |

OTHER PUBLICATIONS

International Search Report and The Written Opinion corresponding to the PCT application No. PCT/CN2008/070851, date of mailing Jul. 31, 2008, 10 pages total.
Bradner. "Key words for use in RFCs to Indicate Requirement Levels", BCP 14, RFC 2119, Mar. 1997.
Aboba et al. "PPP EAP TLS Authentication Protocol", RFC 2716, Oct. 1999.
Rigney et al. "Remote Authentication Dial in User Service (RADIUS)", RFC 2865, Jun. 2000.
Aboba et al. "RADIUS (Remote Authentication Dial in User Service) Support for Extensible Authentication Protocol (EAP)", RFC 3579, Sep. 2003.
Aboba et al. "Extensible Authentication Protocol (EAP)", RFC 3748, Jun. 2004.
Eronen et al. "Diameter Extensible Authentication Protocol (EAP) Application", RFC 4072, Aug. 2005.
Arkko et al. "Extensible Authentication Protocol Method for 3rd Generation Authentication and Key Agreement (EAP-AKA)", RFC 4187, Jan. 2006.
Giaretta. "MIPv6 Authorization and Configuration based on EAP", draft-giaretta-mip6-authorization-eap-04 (work in progress), Oct. 2006.
Gundavelli et al. "Proxy Mobile IPv6", draft-ieff-netlmm-proxymip6-06 (work in progress), Sep. 2007.
[WiMAX-NWG-Stage-2] "WiMAX Forum Network Architecture Stage 2: Architecture Tenets, Reference Model and Reference Points", Stage-2, Part 2, Release 1, Version 1.2.1., Mar. 2008.
[WiMAX-NWG-Stage-3] "WiMAX Forum Network Architecture Stage 3: Detailed Protocols and Procedures", Stage-3 Release 1, Version 1.2.1, Mar. 2008.
Xia, et al., "PMIPv6 service negotiation based on EAP draft-xia-netlmm-service-negotiation-00," Network Working Group, Internet-Draft, May 2007, 22 pages.

\* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|  Type=Negotiation-Result      |            Length             |
+-+-+-+-+-+-+-+-+-+-+-+-+-+-+-+-+-+-+-+-+-+-+-+-+-+-+-+-+-+-+-+-+
|     Code      |
+-+-+-+-+-+-+-+-+

Type

TBD – Negotiation-Result

Length

1

Code

0 = Success

128 = Failure
```

Figure 6

METHOD AND APPARATUS FOR IP MOBILITY MANAGEMENT SELECTION

CROSS-REFERENCES TO RELATED APPLICATIONS

The present application claims benefit under 35 USC 119(e) of U.S. provisional Application No. 60/914,980 filed on Apr. 30, 2007, entitled "System for PMIPV6 Service Negotiation Based on EAP," the content of which is incorporated herein by reference in its entirety.

BACKGROUND OF THE INVENTION

The present invention relates generally to networking and communications systems. More particularly, the invention provides methods and apparatus for network mobility management selection. Merely by way of example, the invention has been applied to a versatile system for an Extensible Authentication Protocol (EAP) based service negotiation between a mobile node (MN) and an Authentication, Authorization and Accounting (AAA) server. But it would be recognized that the invention has a much broader range of applicability.

IP mobility allows mobile nodes to remain reachable while moving around in the Internet. Conventionally, each mobile node is always identified by its home address, regardless of its current point of attachment to the Internet. While situated away from its home, a mobile node is also associated with a care-of address, which provides information about the mobile node's current location. IP packets addressed to a mobile node's home address are transparently routed to its care-of address. Generally, there are two categories as to mobility solutions, that is, Network-based mobility and host-based mobility.

Network-based mobility management enables IP mobility for a host without requiring its participation in any mobility related signaling. The network is responsible for managing IP mobility on behalf of the host. The mobility entities in the network are responsible for tracking the movement of the host and initiating the required mobility signaling on its own behalf. In this application, the Network-based mobility management protocol is called proxy mobile IP. In contrast, host-based mobility management enable IP mobility for a host being actively involved, that is, a host must implement mobile IPv6, or mobile IPv4, or dual stack mobile IP.

As can be seen, various network mobility management mechanisms are available. Therefore, improved method and apparatus for enabling IP mobility management selection is highly desirable.

BRIEF SUMMARY OF THE INVENTION

The present invention relates generally to networking and communications systems. More particularly, the invention provides methods and apparatus for network IP mobility management selection. Merely by way of example, the invention has been applied to a versatile system for an Extensible Authentication Protocol (EAP) based service negotiation between a mobile node (MN) and an Authentication, Authorization and Accounting (AAA) server. But it would be recognized that the invention has a much broader range of applicability.

In an embodiment, the present invention provides a communication network system having capability for IP mobility management selection. The communication system includes a server, a network entity, and at least one mobile nodes (MN). In a specific embodiment, the server can be an Authentication, Authorization and Accounting (AAA) server. The network entity is configured to provide its IP mobility management information to the AAA server, whereas the mobile node is configured to provide its IP mobility management information to the AAA server. In the communication system, the AAA server is configured to make a selection of IP mobility management mechanism based on the information provided by the network entity and the mobile node, and to send the selection to the network entity. Here, the IP mobility management information includes one or more supported IP mobility management protocols. Merely as examples, the supported IP mobility management protocols can include mobile IPv4, mobile IPv6, dual stack mobile IP, and proxy mobile IP, etc.

According to another embodiment of the present invention, a network component includes a processor configured to implement a method of communication. According to such communication method, the network component sends one or more first messages to a server for reporting its IP Mobility management information and authentication information of a mobile node. The network component also receives one or more second messages about selection of IP mobility management mechanism from the server. Here the IP mobility management information can include one or more supported IP mobility management protocols, such as mobile IPv4, mobile IPv6, dual stack mobile IP, and proxy mobile IP. Merely as examples, the component network component can be a PDSN in 3GPP2 networks, an Access Service Network Gateway (ASN-GW) in WiMAX networks, or an Access Router in IEEE802.11 network.

In the above specific embodiment, the one or more first messages can use an Authentication, Authorization and Accounting (AAA) protocol, such as DIAMETER or RADIUS. The one or more second messages can also use an Authentication, Authorization and Accounting (AAA) protocol, such as DIAMETER or RADIUS. Furthermore, the authentication information can include Extensible Authentication Protocol (EAP). Additionally, the network component is capable of performing various functions. For example, the network component is capable of functioning as a foreign agent when the selection is using mobile IPv4 as an IP mobility management mechanism. In another example, the network component is capable of functioning as a mobile access gateway when the selection is proxy mobile IP as an IP mobility management mechanism. Here, a specific example of the proxy mobile IP is proxy mobile IPv6.

According to yet another embodiment of the present invention, a network component, such as a server, has a processor configured to implement a communication method for IP mobility management selection. The server receives IP mobility management information of a network entity, such as a router, and IP authentication information and IP mobility management information of a mobile node. The server also sends a message for selecting IP mobility management to the network entity. Here the network entity can also be a PDSN in 3GPP2 networks, an Access Service Network Gateway (ASN-GW) in WiMAX networks, or an Access Router in IEEE802.11 network.

According to an alternative embodiment, the invention provides a method for IP mobility management selection in a network that includes a mobile node, a network entity, and an Authentication, Authorization and Accounting (AAA) server. First the network entity sends its IP mobility management information to the AAA server, and the mobile node sends its IP mobility management information to the AAA server. The AAA server makes a selection of IP mobility management mechanism based on the information provided by the network entity and the mobile node. The AAA server then sends the selection of IP mobility management mechanism to the network entity.

According to another specific embodiment, the present invention provides a method for PMIPv6 service negotiation based on EAP. In a specific embodiment, the present invention discloses a versatile system for an Extensible Authentication Protocol (EAP) based service negotiation between a mobile node and an AAA server.

Many benefits are achieved by way of the present invention over conventional techniques. For example, an easy to use process is provided that enables the capability for IP mobility management selection. In some embodiments, the invention provides ways for mobile node (MN) and another network entity to provide their respective IP mobility management information to the server. The server then makes a selection of IP mobility management mechanism based on the information provided by the network entity and the mobile node. Subsequently, the server sends the selection to the network entity. Here, the IP mobility management information includes various supported IP mobility management protocols. Merely as examples, the supported IP mobility management protocols can include mobile IPv4, mobile IPv6, dual stack mobile IP, and proxy mobile IP, etc. Depending upon the embodiment, one or more of these benefits may be achieved. These and other benefits will be described in more detail throughout the present specification and more particularly below.

The following description and drawings set forth in detail a number of illustrative embodiments of the invention. These embodiments are indicative of but a few of the various ways in which the present invention may be utilized.

BRIEF DESCRIPTION OF THE DRAWINGS

FIG. 6 is a simplified view diagram illustrating a Negotiation-Result TLV according to an embodiment of the present invention.

DETAILED DESCRIPTION OF THE INVENTION

Figure 1:
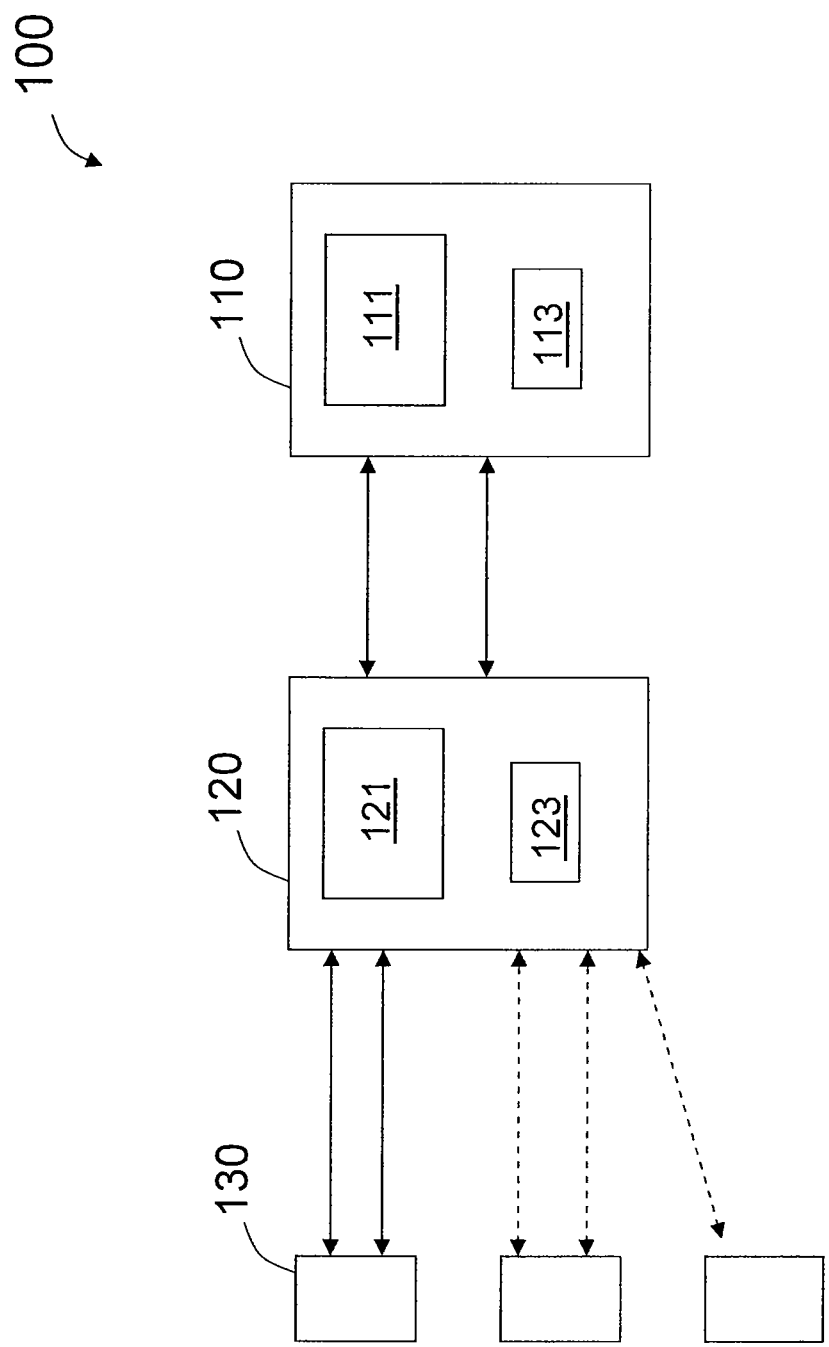
FIG. 1 is a simplified diagram illustrating a communication network system having capability for IP mobility management selection according to a specific embodiment of the present the invention.

The present invention relates generally to networking and communications systems. More particularly, the invention provides methods and apparatus for network mobility management selection. Merely by way of example, the invention has been applied to a versatile system for an Extensible Authentication Protocol (EAP) based service negotiation between a mobile node (MN) and an Authentication, Authorization and Accounting (AAA) server. But it would be recognized that the invention has a much broader range of applicability.

The following discussion is presented to enable a person skilled in the art to make and use the invention. The general principles described herein may be applied to embodiments and applications other than those detailed below without departing from the spirit and scope of the present invention as defined herein. The present invention is not intended to be limited to the embodiments shown, but is to be accorded the widest scope consistent with the principles and features disclosed herein.

Proxy Mobile IPv6 (PMIPv6) is a network based mobility protocol which provides IP session continuity for a mobile node without its involvement in mobility management. PMIPv6 can be viewed as a service provided by networks, and based on its own discretion, a mobile node (MN) may or may not choose the service. PMIPv6 service negotiation between an MN and networks is present in the following scenarios:

1. PMIPv6 is provided to simple IP host to enable IP session continuity;

2. PMIPv6 is not necessary because simple IP host prefers local IP services, such as broadcast news, tourism information and so on;

3. CMIPv6 host wants to make use of PMIPv6 because PMIPv6 is a lower rate mobility service; and 4. CMIPv6 host would not use PMIPv6 because CMIPv6 can provide wider range mobility.

Accordingly, it is desirable for networks to have a mechanism to indicate to the MN the presence of network based mobility management capability. At the same time, the MN also needs to have mechanism to express its preference.

In particular, Extensible Authentication Protocol (EAP) is now becoming prevailing access authentication tool because of its flexibility and extensibility. In certain communication systems, EAP is a mandatory access authentication protocol for WiMAX networks. Therefore it is desirable for the communication system to provide IP service negotiation based on EAP.

According to an embodiment, the present invention discloses a versatile system for an Extensible Authentication Protocol (EAP) based service negotiation between a mobile node and an AAA server. An AAA server has an access router (AR)'s PMIPv6 capability information to act as the mobility access gateway (MAG) which could be manually configured or be reported by the AR/MAG dynamically. PMIPv6 is kind of a service or authorization granted by the AAA server to an MN. Related accounting and forwarding policy should be bound to the service or authorization.

In a specific embodiment, PMIPv6 service negotiation is controlled by the AAA server which exploits the capability of EAP methods to convey generic information items together with authentication data.

In an embodiment, the AAA server configures the AR/MAG based on PMIPv6 service negotiation between the AAA server and the MN. Different service needs different forwarding, accounting policy. The AR/MAG is the policy enforcement point (PEP).

The techniques provided by the present invention are applicable to an access network relying on EAP for user authentication and works with various EAP methods supporting the exchange of general purpose information elements, in any form (e.g. TLVs or AVPs), between EAP peers. Exploiting this capability, an MN and an AAA server can piggyback negotiation messages within the same EAP conversation used to carry out user authentication or re-authentication.

FIG. 1 is a simplified diagram illustrating a communication network system having capability for IP mobility management selection according to a specific embodiment of the present the invention. This diagram is merely an example, which should not unduly limit the scope of the claims herein. One of ordinary skill in the art would recognize other variations, modifications, and alternatives. As shown, communication system 100 includes an Authentication, Authorization and Accounting (AAA) server 110, a network entity 120, and one or more mobile nodes 130. The network entity 120 is configured to provide its IP mobility management information to the AAA server. The mobile node 130 is configured to provide its IP mobility management information to the AAA server. The AAA server 110 is configured to make a selection of IP mobility management mechanism based on the information provided by the network entity 120 and the mobile node 130, and to send the selection to the network entity 120.

In FIG. 1, the network entity 120 can be one of a variety of network devices. For example, the network entity 120 can be one of a PDSN in 3GPP2 networks, an Access Service Network Gateway (ASN-GW) in WiMAX networks, or an Access Router in IEEE802.11 network. In a specific embodiment, the IP mobility management information of the network entity 120 is carried in an AAA message. In a specific embodiment, the AAA message uses an AAA protocol such as DIAMETER or RADIUS. In an embodiment, the IP mobility management information of the mobile node 130 is carried in an Extensible Authentication Protocol (EAP) message.

In an embodiment, server 110 is a network component that includes at least a processor 111 and a memory 113. The processor 111 is configured to implement a method for providing a capability for IP mobility management selection. The method includes receiving IP mobility management information of a network entity 120, such as a router, receiving IP authentication information of a mobile node 130, and sending a message for selecting IP mobility management to the network entity 120. In a specific embodiment, server 110 can be an Authentication, Authorization and Accounting (AAA) server. In other embodiments, server 110 can be other types of server that have authentication capabilities.

Referring to FIG. 1, in a specific embodiment, the network entity 120 is a network component that includes at least a processor 121 and a memory 123. The processor 121 is configured to implement a method for providing a capability for IP mobility management selection. The method includes sending one or more first messages to server 110 for reporting its IP Mobility management information and authentication information of a mobile node. The first messages can use an Authentication, Authorization and Accounting (AAA) protocol, such as DIAMETER or RADIUS. The method also includes receiving one or more second messages about selection of IP mobility management mechanism from the server 110. The second messages can use an Authentication, Authorization and Accounting (AAA) protocol, such as DIAMETER or RADIUS. Depending on the application, the network entity 120 can perform different functions. For example, the network entity 120 is capable of functioning as a foreign agent when the selection is using mobile IPv4 as an IP mobility management mechanism. In another example, the network entity 120 is capable of functioning as a mobile access gateway when the selection is proxy mobile IP as an IP mobility management mechanism. In a specific embodiment, the proxy mobile IP is proxy mobile IPv6.

Although the above has been shown using a selected group of components for providing the capability for IP mobility management selection, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification and more particularly below.

According to another embodiment, the present invention provides a method for IP mobility management selection in a network. In the specific example shown in FIG. 1, the network includes a mobile node 130, a network entity 120, and an Authentication, Authorization and Accounting (AAA) server 110. According to the method, the network entity 120 sends its IP mobility management information to the AAA server 110, and the mobile node 130 sends its IP mobility management information to the AAA server 110. Based on the information from the mobile node and the network entity, the AAA server 110 makes a selection of IP mobility management mechanism. The AAA server 110 then sends the selection of IP mobility management mechanism to the network entity 120.

As discussed above, the network entity 120 can include one of a PDSN in 3GPP2 networks, an Access Service Network Gateway (ASN-GW) in WiMAX networks, or an Access Router in IEEE802.11 network. The IP mobility management information of the network entity is carried in an AAA message, which can include DIAMETER or RADIUS. Additionally, the IP mobility management information of the mobile node can be carried in an extensible authentication protocol (EAP) message. In an example, the network entity is capable of functioning as a mobile access gateway when the selection is using proxy mobile IP as an IP mobility management mechanism. In another example, the network entity is capable of functioning as a foreign agent when the selection is using mobile IPv4 as an IP mobility management mechanism.

The above sequence of processes provides a method for IP mobility management selection in a network according to an embodiment of the present invention. As shown, the method uses a combination of steps including a way of server making a selection of IP mobility management mechanism based on the information provided by the network entity and the mobile node. Other alternatives can also be provided where steps are added, one or more steps are removed, or one or more steps are provided in a different sequence without departing from the scope of the claims herein. Further details of the present method can be found throughout the present specification and more particularly below.

Figure 2:
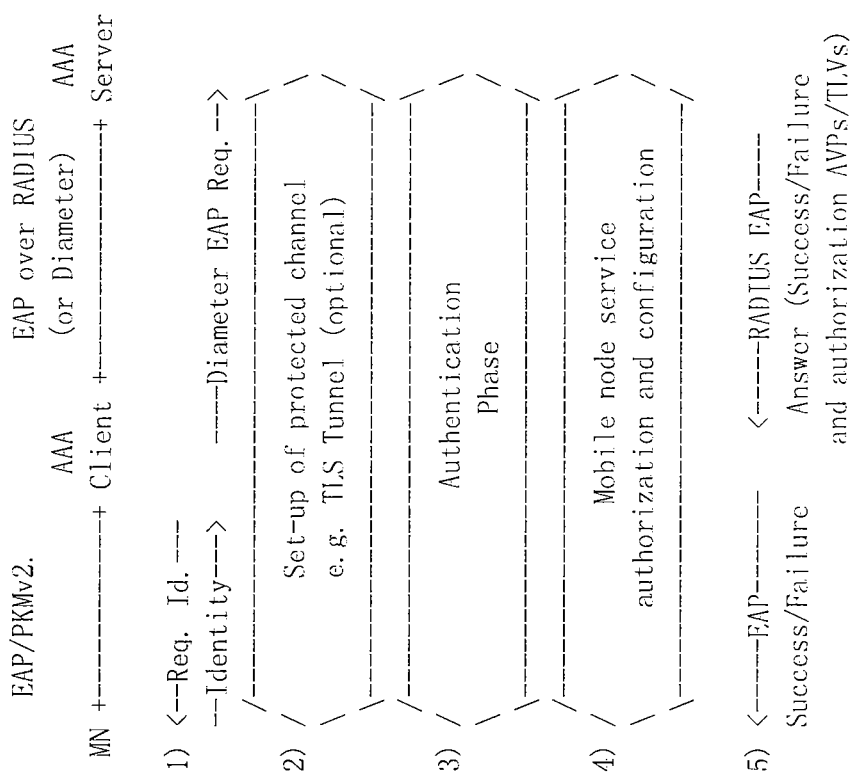
FIG. 2 is a simplified view diagram illustrating an overview of a system and method to handle PMIPv6 service negotiation according to an embodiment of the present invention.

FIG. 2 is a simplified view diagram illustrating an overview of a system and method to handle PMIPv6 service negotiation according to an embodiment of the present invention. This diagram is merely an example, which should not unduly limit the scope of the claims herein. One of ordinary skill in the art would recognize other variations, modifications, and alternatives. In embodiments of the invention, a communication system can include a terminal device, a network router server, and a server. As shown in the specific embodiment in FIG. 2, the communication system includes a mobile node (MN), an authentication, authorization, and application (AAA) client, and an AAA server. A specific example of the processes involved in network service negotiation are discussed below, with reference to FIG. 2.

1. The first EAP identity exchange. The MN is polled for its identity by means of an EAP Request Identity message when the MN enters a network. This message is used to start the EAP communication. The MN replies an EAP Response Identity message which is received by an AAA client (e.g. AR/MAG or ASN-GW) and forwarded to an AAA server using RADIUS EAP extension (or Diameter EAP application). Then the AAA server selects an EAP method (e.g. based on the user's profile) and proposes it to the MN in subsequent EAP messages.

2. Set-up of a protected channel (e.g. TLS tunnel and so on) for the delivery of subsequent EAP signaling. This is an optional step that is present only if the EAP method provides confidentiality support. It is mandatory only if the MN-AAA negotiation involves the exchange of sensitive information.

3. Authentication phase. The actual authentication procedure and its security properties depend on the selected EAP method. Each EAP conversation may accomplish user authentication relying on any available EAP method (e.g. EAP-MD5, EAP-SIM, EAP-AKA).

4. MN service authorization and configuration. The MN and the AAA server exchange a sequence of signaling messages to authorize and configure the MN. Those messages are encapsulated as requested by the employed EAP method (e.g. TLVs or AVPs) and delivered as part of the on-going EAP session. During this phase, the AAA server advertises the network's PMIPv6 capability to the MN, and the MN then decides if PMIPv6 service is needed or not. The details are elaborated hereinafter.

5. EAP session termination. After successful authentication and authorization, the AAA server sends the AAA client RADIUS Access-Accept message in which Result-Code is set to SUCCESS. The AAA client configures itself based on authorization, and forwards the result to the MN to terminate the EAP session.

Figure 3:
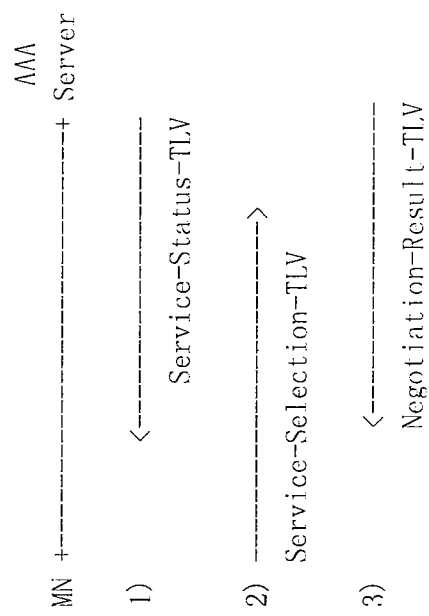
FIG. 3 is a simplified view diagram illustrating detailed description of PMIPv6 Authorization according to an embodiment of the present invention.

FIG. 3 is a simplified view diagram illustrating detailed description of PMIPv6 Authorization according to an embodiment of the present invention. This diagram is merely an example, which should not unduly limit the scope of the claims herein. One of ordinary skill in the art would recognize other variations, modifications, and alternatives. As shown, FIG. 3 provides more detailed description of stage 4 in FIG. 2, in which the mobile node (MN) and the AAA server exchange messages.

In an embodiment, all messages used for MN's PMIPv6 authorization are encoded in TLVs which can be optionally carried by a generic container described in Giaretta, G., "MIPv6 Authorization and Configuration based on EAP", draft-giaretta-mip6-authorization-eap-04 (work in progress), October 2006. The generic container simplifies a lot the deployment of the procedure with any EAP method. For conciseness, only PMIPv6 authorization related TLVs are illustrated in FIG. 3.

According to an embodiment as shown in FIG. 2, the authorization negotiation process includes the following TLVs:
1. Service-Status-TLV;
2. Service-Selection-TLV; and
3. Negotiation-Result-TLV.
Each of these TLVs is discussed in more detail below.

Figure 4:
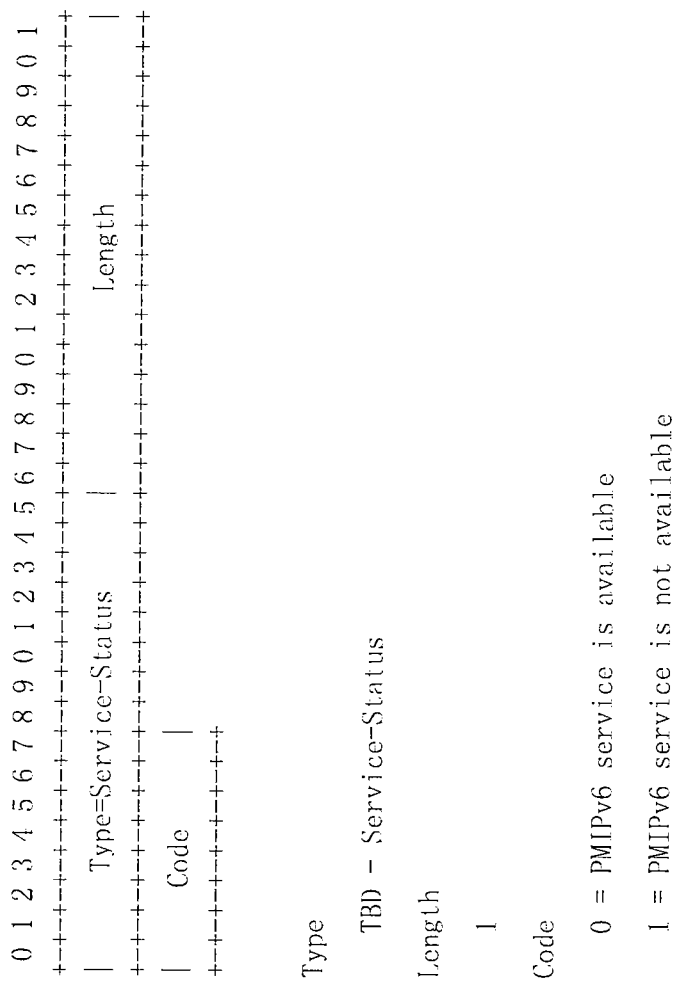
FIG. 4 is a simplified view diagram illustrating a Service-Status-TLV according to an embodiment of the present invention.

FIG. 4 is a simplified view diagram illustrating a Service-Status-TLV according to an embodiment of the present invention. In an embodiment, this TLV is sent by the AAA server to inform the MN on the status of PMIPv6 service. An AAA server starts the PMIPv6 negotiation phase by sending to an MN a Service-Status-TLV defined in Section 5.1. PMIPv6 capability is indicated to MN for choice.

Figure 5:
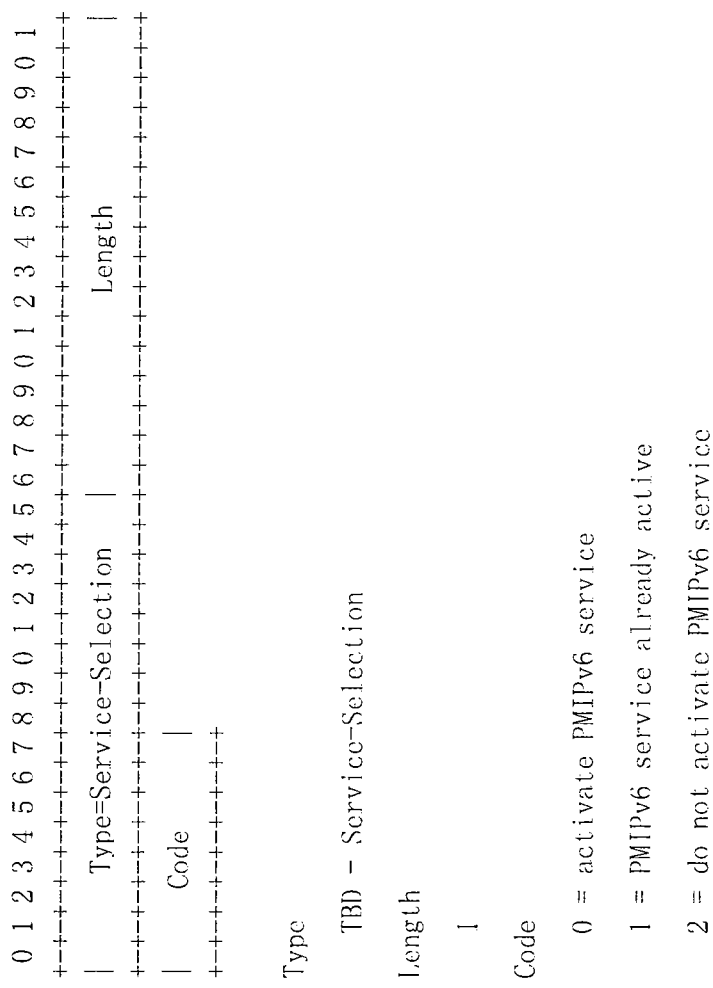
FIG. 5 is a simplified view diagram illustrating a Service-Selection TLV according to an embodiment of the present invention.

FIG. 5 is a simplified view diagram illustrating a Service-Selection TLV according to an embodiment of the present invention. In a specific embodiment, this TLV is sent by the MN to inform the AAA server whether it wants the PMIPv6 service to be activated or not. The MN replies to this first message by confirming its intention to make use of PMIPv6 or not. Service-Selection-TLV defined hereinafter is used to convey this preference.

FIG. 6 is a simplified view diagram illustrating a Negotiation-Result TLV according to an embodiment of the present invention. In an embodiment, the Negotiation-Result-TLV for EAP is shown in FIG. 6. The AAA server sends Negotiation-Result-TLV defined hereinafter to terminate PMIPv6 authorization procedure.

According to another embodiment, the present invention provides extension of attribute Service-Type for RADIUS. This attribute indicates the type of service the user has requested, or the type of service to be provided, as defined in Rigney, C., Willens, S., Rubens, A., and W. Simpson, "Remote Authentication Dial In User Service (RADIUS)," RFC 2865, June 2000. Depending upon the embodiment, it may be used in both Access-Request and Access-Accept packets. In this, AAA server notifies AR to function through RADIUS protocol based on negotiation between the AAA server and MN. A new service type called PMIPv6 is to be formally defined.

With regard to security considerations, only a few new options/TLVs are needed for the PMIPv6 service negotiation according to embodiments of the present invention. Accordingly, no additional security threat is likely to be introduced.

The previous description of the disclosed embodiments is provided to enable those skilled in the art to make or use the present invention. Various modifications to these embodiments will be readily apparent to those skilled in the art and generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A network component, comprising:
a processor configured to implement a method comprising:
sending one or more first messages to a server to report
a first information about network-based IP mobility management of the network component,
a second information about host-based IP mobility management, different from the first information, and a third authentication information of a mobile node, wherein the first information and the second information each comprises one or more supported IP mobility management protocols, the supported IP mobility management protocols including mobile IPv4, mobile IPv6, dual stack mobile IP, and proxy mobile IP; and
receiving one or more second messages from the server, the one or more second messages being related to selection of an IP mobility management mechanism being determined solely by the server based on the first information about network-based IP mobility management and the second information about host-based IP mobility management.

2. The network component of claim 1 wherein the network component is capable of functioning as a mobile access gateway when the selection is proxy mobile IP as an IP mobility management mechanism.

3. The network component of claim 2 wherein the proxy mobile IP is proxy mobile IPv6.

4. The network component of claim 1 wherein the one or more second messages uses an Authentication, Authorization and Accounting (AAA) protocol, the AAA protocol being DIAMETER or RADIUS.

5. The network component of claim 1 wherein the authentication information is carried in Extensible Authentication Protocol (EAP).

6. The network component of claim 1 wherein the network component comprises one of a PDSN in 3GPP2 networks, an Access Service Network Gateway (ASN-GW) in WiMAX networks, or an Access Router in an IEEE 802.11 network.

7. The network component of claim 1 wherein the network component is capable of functioning as a foreign agent when the selection is using mobile IPv4 as an IP mobility management mechanism.

8. The network component of claim 1 wherein the one or more first messages use an Authentication, Authorization and Accounting (AAA) protocol, the AAA protocol being DIAMETER or RADIUS.

9. A network component comprising:
   a processor configured to implement a method comprising:
   receiving a first information about network-based IP mobility management from a network entity;
   receiving a second information about host-based IP mobility management, different from the first information, and a third authentication information from a mobile node, wherein the first information and the second information each comprises one or more supported IP mobility management protocols, the supported IP mobility management protocols including mobile IPv4, mobile IPv6, dual stack mobile IP, and proxy mobile IP;
   making a selection of an IP mobility management mechanism based only on the first information and the second information received from the network entity and the mobile node, respectively; and
   sending a message for selecting the IP mobility management mechanism to the network entity.

10. The network component of claim 9 wherein the network entity comprises one of a PDSN in 3GPP2 networks, an Access Service Network Gateway (ASN-GW) in WiMAX networks, or an Access Router in an IEEE802.11 network.

11. The network component of claim 10 wherein the network entity is capable of functioning as a foreign agent when the selection is using mobile IPv4 as an IP mobility management mechanism.

12. The network component of claim 10 wherein the first information about network-based IP mobility management from the network entity is carried in an AAA message, the AAA message using DIAMETER or RADIUS protocol.

13. The network component of claim 10 wherein the second information about host-based IP mobility management from the mobile node is carried in an extensible authentication protocol (EAP) message.

14. The network component of claim 10 wherein the network entity is capable of functioning as a mobile access gateway when the selection is using proxy mobile IP as an IP mobility management mechanism.

15. A method for IP mobility management selection in a network that includes a mobile node, a network entity, and an Authentication, Authorization and Accounting (AAA) server, the method comprising:
   the AAA server receiving a first information about network-based IP mobility management from the network entity;
   the AAA server receiving a second information about host-based IP mobility management, different from the first information, from the mobile node, wherein the first information and the second information each comprises one or more supported IP mobility management protocols, the supported IP mobility management protocols including mobile IPv4, mobile IPv6, dual stack mobile IP, and proxy mobile IP;
   the AAA server making a selection of an IP mobility management mechanism based only on the first information provided by the network entity and the second information provided by the mobile node; and
   the AAA server sending the selection of the IP mobility management mechanism to the network entity.

16. The method of claim 15 wherein the network entity comprises one of a PDSN in 3GPP2 networks, an Access Service Network Gateway (ASN-GW) in WiMAX networks, or an Access Router in an IEEE 802.11 network.

17. The method of claim 16 wherein the network entity is capable of functioning as a foreign agent when the selection is using mobile IPv4 as an IP mobility management mechanism.

18. The method of claim 16 wherein the first information about network-based IP mobility management from the network entity is carried in an AAA message, the AAA message using DIAMETER or RADIUS protocol.

19. The method of claim 16 wherein the second information about host-based IP mobility management from the mobile node is carried in an extensible authentication protocol (EAP) message.

20. The method of claim 16 wherein the network entity is capable of functioning as a mobile access gateway when the selection is using proxy mobile IP as an IP mobility management mechanism.

21. A communication network system having capability for IP mobility management selection, comprising:
   an Authentication, Authorization and Accounting (AAA) server configured to receive a second information about host-based IP mobility management from a mobile node; and
   a network entity, configured to provide a first information about network-based IP mobility management, different from the second information, to the AAA server,
   wherein the first information and the second information each comprises one or more supported IP mobility management protocols, the supported IP mobility management protocols including mobile IPv4, mobile IPv6, dual stack mobile IP, and proxy mobile IP;
   wherein the AAA server is configured to make a selection of an IP mobility management mechanism based solely on the first information about network-based IP mobility management provided by the network entity and the second information about host-based IP mobility management received from the mobile node, and to send the selection to the network entity.

22. The system of claim 21 wherein the network entity comprises one of a PDSN in 3GPP2 networks, an Access Service Network Gateway (ASN-GW) in WiMAX networks, or an Access Router in an IEEE 802.11 network.

23. The system of claim 22 wherein the first information about network-based IP mobility management provided by the network entity is carried in an AAA message, the AAA message using DIAMETER or RADIUS protocol.

24. The system of claim 21, further comprising the mobile node.

* * * * *